United States Patent
Liang et al.

(10) Patent No.: US 12,475,539 B2
(45) Date of Patent: Nov. 18, 2025

(54) IMAGE PROCESSING METHOD AND APPARATUS

(71) Applicant: Beijing Bytedance Network Technology Co., Ltd., Beijing (CN)

(72) Inventors: Xinglun Liang, Beijing (CN); Can Wang, Beijing (CN); Ze Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 40 days.

(21) Appl. No.: 18/570,496

(22) PCT Filed: Sep. 21, 2022

(86) PCT No.: PCT/CN2022/120368
§ 371 (c)(1),
(2) Date: Dec. 14, 2023

(87) PCT Pub. No.: WO2023/061173
PCT Pub. Date: Apr. 20, 2023

(65) Prior Publication Data
US 2024/0249391 A1  Jul. 25, 2024

(30) Foreign Application Priority Data
Oct. 13, 2021 (CN) .......................... 202111192756.7

(51) Int. Cl.
*G06T 5/50* (2006.01)
*G06T 7/90* (2017.01)
(Continued)

(52) U.S. Cl.
CPC .................. *G06T 5/50* (2013.01); *G06T 7/90* (2017.01); *G06T 15/00* (2013.01); *G06V 10/56* (2022.01);
(Continued)

(58) Field of Classification Search
None
See application file for complete search history.

(56) References Cited

U.S. PATENT DOCUMENTS

| | | | |
|---|---|---|---|
| 2013/0121567 A1* | 5/2013 | Hadap | G06F 18/2134 345/426 |
| 2014/0125686 A1* | 5/2014 | Volotinen | G06T 15/005 345/549 |
| 2022/0414950 A1* | 12/2022 | Brennan | G06T 1/20 |

FOREIGN PATENT DOCUMENTS

| | | |
|---|---|---|
| CN | 107122777 A | 9/2017 |
| CN | 107833220 A | 3/2018 |

(Continued)

OTHER PUBLICATIONS

ISA China National Intellectual Property Administration, International Search Report Issued in Application No. PCT/CN2022/120368, Nov. 28, 2022, 9 pages.

*Primary Examiner* — Frank S Chen
(74) *Attorney, Agent, or Firm* — Alleman Hall & Tuttle LLP

(57) ABSTRACT

The present disclosure provides an image processing method and apparatus. The method comprises: obtaining an RGB image and a stencil buffer, wherein the RGB image comprises image information taken by a physical camera and image information rendered by a virtual object rendering module, and the stencil buffer is used for storing stencil values corresponding to pixels on the RGB image; obtaining a target image by processing the RGB image according to the stencil buffer; obtaining a post-processed image by post-processing the target image; determining an image to be displayed according to the post-processed image. In this way, the post-processing object is flexible and controllable. The user therefore has a stronger sense of participation and a better experience.

15 Claims, 6 Drawing Sheets

(51) Int. Cl.
*G06T 15/00* (2011.01)
*G06V 10/56* (2022.01)
(52) U.S. Cl.
CPC ............... *G06T 2207/10024* (2013.01); *G06T 2207/20221* (2013.01)

(56) References Cited

FOREIGN PATENT DOCUMENTS

CN 108537815 A 9/2018
WO 2011067755 A1 6/2011

\* cited by examiner

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 0 | 0 | 0 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Original stencil buffer

↓ Update

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 0 | 0 | 0 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |
| 0 | 0 | 0 | 1 | 1 | 1 | 1 | 1 | 1 | 1 | 0 | 0 | 0 | 0 | 0 | 0 |

Stencil buffer

Fig. 6

IMAGE PROCESSING METHOD AND APPARATUS

CROSS-REFERENCE OF RELATED APPLICATIONS

The present application is a national stage application filed under 35 U.S.C. 371 based on International Patent Application No. PCT/CN2022/120368, filed on Sep. 21, 2022, which claims a priority right of the Chinese patent filed on Oct. 13, 2021, entitled as "IMAGE PROCESSING METHOD AND APPARATUS" and having the Chinese application No. 202111192756.7. The full disclosures of these applications are incorporated in the present application by reference.

FIELD

The present disclosure relates to the image processing field, and more specifically, to an image processing method and apparatus.

BACKGROUND

In augmented reality (AR for short) scenarios, an image seen by users is comprised of two parts of contents, i.e., content taken by a physical camera and content rendered by a virtual camera. After the regular scene rendering is done, the rendering result is processed again, which is known as image post-processing.

In the prior art, all pixels are involved in the operation during post-processing. However, in AR scenarios, if the post-processing is performed only on the content rendered by the virtual camera, or only on an object assigned by the user in the content rendered by the virtual camera, the user may have a different viewing experience and a strong sense of immersion. The prior art could not satisfy such need.

SUMMARY

The present disclosure provides image processing method and apparatus for addressing the problem in the prior art, i.e., the post-processing could not be performed only on the assigned object.

In a first aspect, the present disclosure provides an image processing method, comprising: obtaining an RGB image and a stencil buffer, wherein the RGB image comprises: image information taken by a physical camera and image information rendered by a virtual object rendering module, and the stencil buffer is used for storing stencil values corresponding to pixels on the RGB image, and pixels to be post-processed and pixels not to be post-processed on the RGB image correspond to different stencil values; obtaining a target image by processing the RGB image according to the stencil buffer, wherein pixels not to be post-processed in the target image are in preset color; obtaining a post-processed image by post-processing the target image; determining an image to be displayed according to the post-processed image.

Optionally, obtaining the RGB image and the stencil buffer comprises: obtaining the RGB image according to RGB values of the image information taken by the physical camera and RGB values of the image information rendered by the virtual object rendering module; obtaining the stencil buffer by updating stencil values of the pixels to be post-processed in an original stencil buffer to a pre-set value, wherein stencil values corresponding to pixels stored in the original stencil buffer are a default value and the pre-set value differ from the default value.

Optionally, obtaining the target image by processing the RGB image according to the stencil buffer comprises: creating a render target; copying RGB values of pixels on the RGB image into the render target; setting RGB values of pixels on the RGB image to zero; for each pixel on the RGB image, querying in the stencil buffer whether a stencil value corresponding to the pixel is a pre-set value; in the case that the stencil value corresponding to the pixel is the pre-set value, obtaining an RGB value of the pixel by querying the render target; in the case that the stencil value corresponding to the pixel is not the pre-set value, no processing being performed.

Optionally, determining an image to be displayed according to the post-processed image comprises: obtaining the image to be displayed by fusing the render target with the post-processed image.

Optionally, obtaining the image to be displayed by fusing the render target with the post-processed image comprises: obtaining the image to be displayed by substituting an RGB value of a pixel in the render target with a corresponding RGB value of a target pixel of the post-processed image, the target pixel comprising a pixel having non-zero RGB value.

In a second aspect, the present disclosure provides an apparatus for image processing comprising: an obtaining module configured to obtain an RGB image and a stencil buffer, wherein the RGB image comprises: image information taken by a physical camera and image information rendered by a virtual object rendering module, and the stencil buffer is used for storing stencil values corresponding to pixels on the RGB image, and pixels to be post-processed and pixels not to be post-processed on the RGB image correspond to different stencil values; wherein the obtaining module is further configured to obtain a target image by processing the RGB image according to the stencil buffer, wherein pixels not to be post-processed in the target image are in preset color; a post-processing module configured to obtain a post-processed image by post-processing the target image; a fusion module configured to determine an image to be displayed according to the post-processed image.

Optionally, the obtaining module is further configured to: obtain the RGB image according to RGB values of the image information taken by the physical camera and RGB values of the image information rendered by the virtual object rendering module; obtain the stencil buffer by updating stencil values of the pixels to be post-processed in an original stencil buffer to a pre-set value, wherein stencil values corresponding to pixels stored in the original stencil buffer are a default value and the pre-set value differ from the default value.

In a third aspect, the present disclosure provides a computer program product comprising a computer program, the computer program, when executed by a processor, implementing the method according to the first aspect.

In a fourth aspect, the present disclosure provides a computer readable storage medium, storing a computer program thereon, the computer program, when executed by a processor, implementing the method according to the first aspect.

In a fifth aspect, the present disclosure provides a terminal device, comprising: a processor and a memory storing executable instructions of the processor; wherein the processor is configured to implement the method according to the first aspect by executing the executable instructions.

In a sixth aspect, the present disclosure also provides a computer program, the computer program, when executed by a computer, implementing the method according to the first aspect.

The method and apparatus for image processing provided by the present disclosure first obtain an RGB image and a stencil buffer, wherein the RGB image comprises: image information taken by a physical camera and image information rendered by a virtual object rendering module, and then process the RGB image according to the stencil buffer to obtain a target image, wherein rest pixels in the target image apart from the pixels to be post-processed are black. Subsequently, the method and apparatus post-process the target image to obtain a post-processed image and further obtain an image to be displayed according to the post-processed image.

BRIEF DESCRIPTION OF THE DRAWINGS

FIG. 6 illustrates a schematic diagram of the original stencil buffer provided by the present disclosure;

DETAILED DESCRIPTION OF EMBODIMENTS

Figure 1:
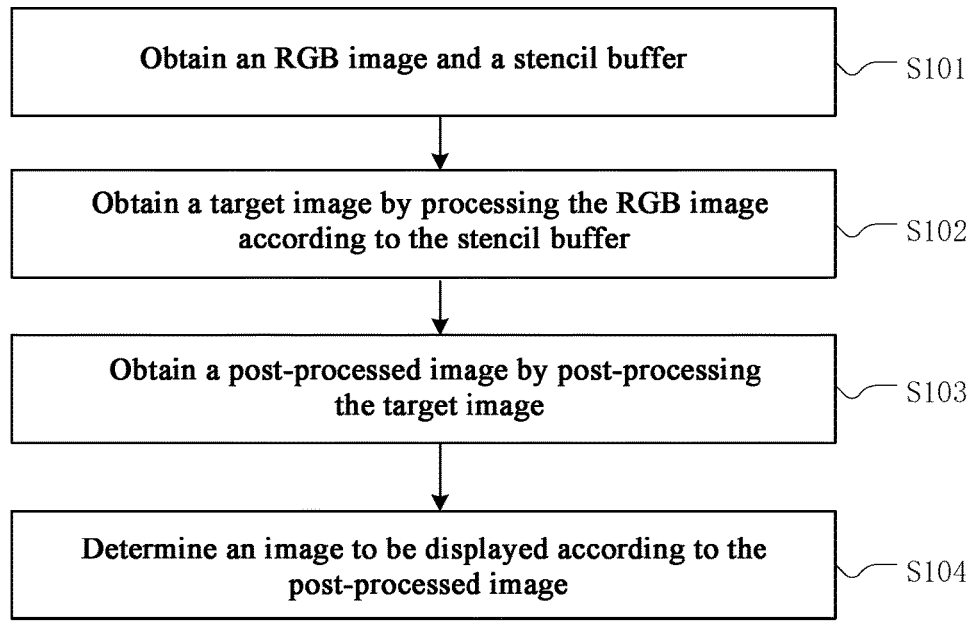
FIG. 1 illustrates a schematic flowchart of Example I of the image processing method provided by the present disclosure.

The technical solution of the present disclosure is to be described clearly and comprehensively below with reference to the drawings in the present disclosure, to better understand the objectives, technical solution and the advantages of the present disclosure. Apparently, the described embodiments are just a part of the embodiments of the present disclosure, rather than all of them. Based on the embodiments of the present disclosure, all other embodiments that can be obtained by those skilled in the art without any exercises of inventive work fall within the protection scope of the present disclosure.

In the present disclosure, it is to be explained that the terms "first" and "second" are provided only for descriptive purpose without indicating or suggesting relative importance. Besides, the term "at least one" refers to one or more and "a plurality of" indicates two or more than two. The term "and/or" describes an association between associated objects and may denote three possible relations. For example, A and/or B may indicate A alone, both A and B, or B alone, where A and B may be in singular or plural form. When two associated objects are linked by the symbol " ", it generally indicates an "OR" relation. The term "at least one of" or similar expressions refer to any combinations of the following items, including any combinations of single item or multiple items. For example, the term of "at least one of a, b or c" may indicate a alone, b alone, c alone, a combination of a and b, a combination of a and c and a combination of b and c, or a combination of a, b and c, where a, b and c may be in singular or plural form.

In AR scenarios, an image seen by users is comprised of two parts of contents, i.e., content taken by a physical camera and content rendered by a virtual camera. After the regular scene rendering is done, the rendering result is processed again, which is known as image post-processing. Images that are post-processed by various post-processing algorithms present different effects, e.g., Bloom, Color Grading, Depth of Field (DOF for short), and Screen-Space Ambient Occlusion (SSAO for short) etc.

In AR scenarios, if the post-processing is performed only on the content rendered by the virtual camera, or only on an object assigned by the user in the content rendered by the virtual camera, the user may have a different viewing experience and a strong sense of immersion. The prior art could not satisfy such need.

In some embodiments, two virtual cameras are created, where a first virtual camera is used for rendering the entire virtual scene and the second virtual camera is provided for drawing a pixel mask image that is to be post-processed. When the rendered content is post-processed by the first virtual camera, the pixel mask image output by the second virtual camera is sampled to remove pixels not to be post-processed. In the end, the post-processed content is superimposed with the content taken by the physical camera to produce the final image. However, it is required to create an additional virtual camera and draw a pixel mask image in the above method, which may affect the frame rate and easily cause video lags.

In the present disclosure, during the rendering of the entire image, stencil values of pixels that are required to be post-processed in an original buffer stencil are updated to a pre-set value to obtain a corresponding stencil buffer, wherein the pixels that are required to be post-processed may be assigned by the user. Afterwards, contents that are required to be post-processed are intercepted from the entire image using the stencil buffer and intercepted contents are then post-processed. The post-processed contents are superimposed with an RGB image obtained from the rendering phase to generate a final image. When the post-processing process is performed only on the pixels that are required to be post-processed, the object of the post-processing is flexible and controllable. The user therefore has a stronger sense of participation and a better experience. In such case, no additional virtual camera is created and no pixel mask image is drawn. Therefore, the influence on frame rate is decreased and the possibility of video lags is reduced.

The method provided by the present disclosure may be executed by a terminal device with a physical camera provided thereon, the physical camera being used for taking real scenes. The physical camera may be a camera or any apparatus as long as it can fulfill the image acquisition function. The present disclosure is not restricted in this regard. The terminal device also may include a virtual object rendering module for rendering the virtual object, where the virtual object may be a virtual scene or a virtual character etc. The present disclosure is not restricted in this regard. The virtual object rendering module may be a virtual camera. The terminal device may be a mobile phone, a tablet computer, a smart watch, or a television etc. As a non-restrictive example, the terminal device also may be a wearable device in the present disclosure. The wearable device also may be known as wearable smart device, i.e., a collective name of devices obtained by applying the wearable technology to intelligent design and development of daily wear, such as glasses, gloves, watches, clothes and shoes etc. The wearable device is a portable device directly worn on the body, or integrated into clothes or accessories of the user. The forms of the terminal device are not restricted.

The technical solution of the present disclosure and how the technical solution of the present disclosure addresses the above technical problems are to be explained in details below through specific embodiments. The following several specific embodiments may be combined with each other, and same or similar concepts or processes may not be repeated in some embodiments. Embodiments of the present disclosure are to be described below with reference to the accompanying drawings.

Embodiment I

FIG. 1 illustrates a schematic flowchart of Embodiment I of the image processing method provided by the present disclosure. As shown in FIG. 1, the image processing method provided by this embodiment comprises:

S101: obtaining an RGB image and a stencil buffer.

Wherein the RGB image comprises: image information taken by a physical camera and image information rendered by a virtual object rendering module. In the present disclosure, the image information taken by the physical camera may be understood as content taken by the physical camera and the image information rendered by the virtual object rendering module may also be interpreted as content rendered by the virtual object rendering module. As an example, the RGB image is rendered according to RGB values of the image information taken by the physical camera and RGB values of the image information rendered by the virtual object rendering module. At the end of the rendering process, two results may be obtained, where one is the RGB image and the other is the stencil buffer corresponding to the RGB image. The stencil buffer is used for storing stencil values corresponding to respective pixels on the RGB image. The stencil value in the stencil buffer usually is 8-bit, so each pixel has 256 stencil values. The pixels to be post-processed and pixels not to be post-processed on the RGB image correspond to different stencil values. Therefore, the pixels to be post-processed may be easily found for subsequent post-processing. The rendering process is already disclosed in the prior art and will not be repeated here.

Examples are provided below for further explanation.

Figure 2:
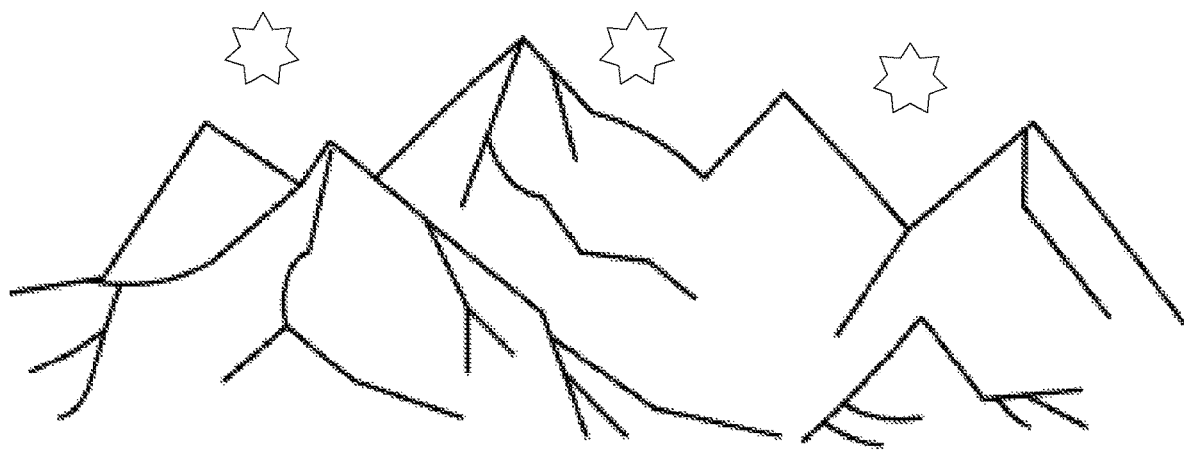
FIG. 2 illustrates a schematic diagram of the RGB image provided by the present disclosure.
Figures 3, 4:
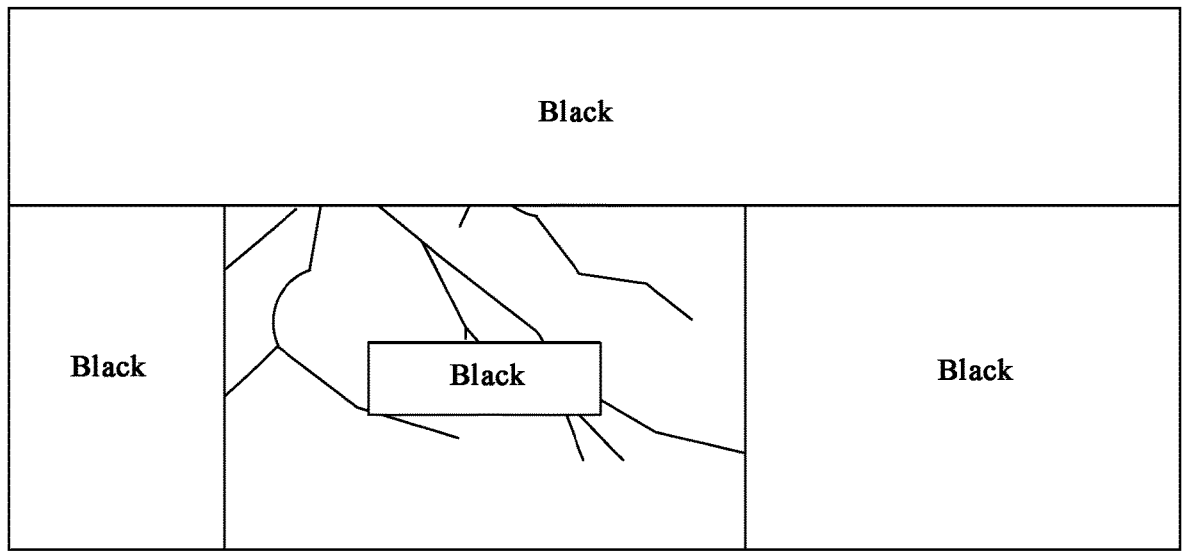
FIG. 3 illustrates a schematic diagram of the stencil buffer provided by the present disclosure.
FIG. 4 illustrates a first schematic diagram of the target image provided by the present disclosure.

FIG. 2 illustrates the RGB image rendered based on the RGB value of the image information taken by the physical camera and the RGB value of the image information rendered by the virtual object rendering module. FIG. 3 illustrates the stencil buffer corresponding to the RGB image, wherein the stencil buffer stores the stencil values corresponding to respective pixels on the RGB image. According to FIG. 3, assuming that pixels in row 4, columns 4-10, row 5, columns 4-10, row 6, columns 4, 5, 9 and 10, row 7, columns 4-10 and row 8, columns 4-10 of the RGB image are required to be post-processed, the stencil value corresponding to these pixels may be set to 1 and the stencil values corresponding to the rest pixels are all set to 0.

S102: obtaining a target image by processing the RGB image according to the stencil buffer.

Wherein pixels not to be post-processed in the target image are in preset color, and the preset color for example may be black. The present disclosure is described by an example of black.

Optionally, for each pixel on the RGB image, a stencil value corresponding to the pixel is queried in the stencil buffer and the found stencil value is compared with the pre-set value. If the found stencil value is the pre-set value, the original RGB value of the pixel is maintained; if the found stencil value is not the pre-set value, the RGB value of the pixel is set to zero to obtain the target image. Because only the RGB values of the pixels having the stencil values equal to the pre-set value in the target image are kept, i.e., only the RGB values of the pixels to be post-processed are maintained in the target image, the rest pixels on the target image are all black except for those requiring post-processing.

Examples are provided below for further explanation.

With reference to FIGS. 2 and 3, since the pixels in row 4, columns 4-10, row 5, columns 4-10, row 6, columns 4, 5, 9 and 10, row 7, columns 4-10 and row 8, columns 4-10 on the RGB image correspond to the stencil value of 1 and the stencil values corresponding to the rest pixels are 0, only the RGB values of the pixels in row 4, columns 4-10, row 5, columns 4-10, row 6, columns 4, 5, 9 and 10, row 7, columns 4-10 and row 8, columns 4-10 are kept and the rest pixels are all black according to FIG. 4.

S103: obtaining a post-processed image by post-processing the target image.

The target image is post-processed with corresponding post-processing algorithms depending on the actual situations, to obtain the post-processed image. The common post-processing algorithms include Edge Detection algorithm, Blur Algorithm, Bloom algorithm, Color Grading algorithm, Depth of Field (DOF for short) algorithm, and Screen-Space Ambient Occlusion (SSAO for short) algorithm etc. The detailed procedure of post-processing is provided in the prior art and will not be repeated here.

S104: determining an image to be displayed according to the post-processed image.

Specifically, after obtaining a post-processed image by post-processing the target image, the post-processed image is then fused with the RGB image obtained from S101, then a final image to be displayed may be obtained. With reference to the above description, in the solution of this embodiment, the pixels to be post-processed may be marked by the stencil buffer and the content requiring post-processing on the RGB image is then intercepted based on the stencil buffer and the RGB image obtained from the rendering phase. The intercepted content is post-processed and the post-processed content is superimposed with the RGB image obtained from S101 to generate the final image. In this way, the post-processing is performed only on the pixels to be post-processed, such that the post-processing object is flexible and controllable. The user therefore has a stronger sense of participation and a better experience. In such case, no additional virtual camera is created and no pixel mask image is drawn. Therefore, the influence on frame rate is decreased and the possibility of video lags is reduced.

The method for image processing provided by this embodiment first obtains an RGB image and a stencil buffer, wherein the RGB image comprises: image information taken by a physical camera and image information rendered by a virtual object rendering module, and then processes the RGB image according to the stencil buffer to obtain a target image, wherein rest pixels in the target image apart from the pixels to be post-processed are black. Subsequently, the method post-processes the target image to obtain a post-processed image and further obtains an image to be displayed according to the post-processed image. In this way, the post-processing object is flexible and controllable. The user therefore has a stronger sense of participation and a better experience.

Embodiment II

Figure 5:
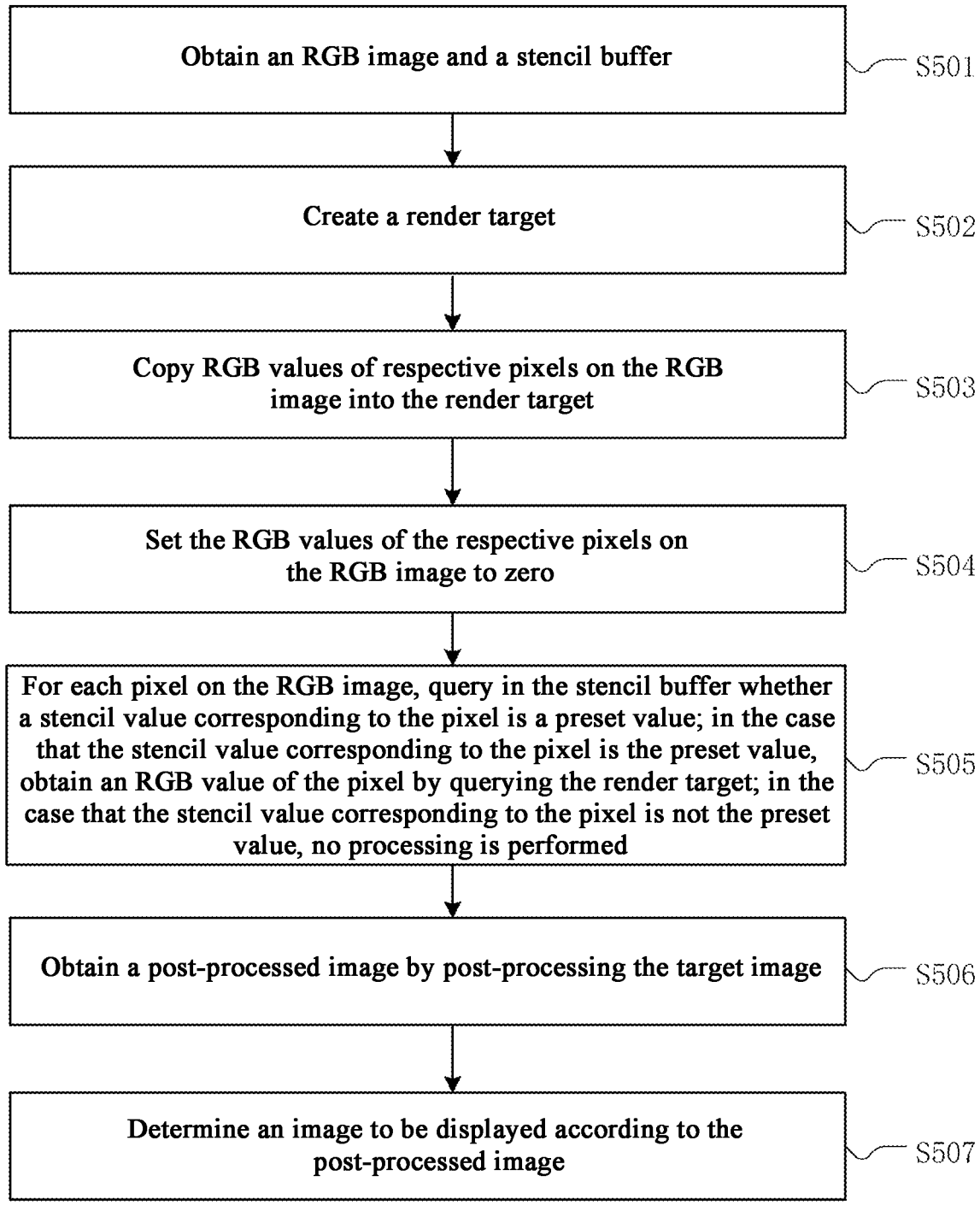
FIG. 5 illustrates a schematic flowchart of Example II of the image processing method provided by the present disclosure.

FIG. 5 illustrates a schematic flowchart of Embodiment II of the method for image processing provided by the present disclosure. As shown in FIG. 5, the method for image processing provided by this embodiment comprises:

S501: obtaining an RGB image and a stencil buffer.

The RGB image is rendered according to RGB values of the image information taken by a physical camera and RGB values of image information rendered by a virtual object rendering module. During the rendering process, stencil values corresponding to the pixels to be post-processed on the RGB image in an original stencil buffer are updated to a pre-set value to obtain the stencil buffer. All stencil values stored in the original stencil buffer may be default value, which default value differ from the pre-set value. The default value may be 0.

The procedure of obtaining the stencil buffer is explained below by examples:

FIG. 6 illustrates a schematic diagram of the original stencil buffer and all stencil values stored in the original stencil buffer may be 0. During the rendering process, stencil values corresponding to the pixels to be post-processed may be updated to a pre-set value to obtain the stencil buffer. The pre-set value may be flexibly set depending on the actual situations. For example, the pre-set value is configured to 1 in the present disclosure. The present disclosure is not restricted in this regard.

Subsequent to obtaining the RGB image and the stencil buffer, this embodiment may obtain the target image through steps of S502-S505.

S502: creating a render target (RT for short).

The render target is an image having the same size as the RGB image.

S503: copying RGB values of respective pixels on the RGB image into the render target RT.

The RGB image obtained from S501 is copied as backup because it is to be fused with the post-processed image in the following steps. During backup, the render target RT may be created and the RGB value of each pixel on the RGB image is copied into the render target, to produce a backup image of the RGB image obtained from S501.

S504: setting RGB values of respective pixels on the RGB image to 0.

Since the backup of the RGB image obtained from S501 has already been obtained, the RGB image may be processed. First of all, it is required to set the RGB value of each pixel on the RGB image to 0. The entire RGB image thus becomes black, so as to avoid the influences on the post-processing procedure by the background pixels (i.e., pixels not to be post-processed).

S505: for each pixel on the RGB image, querying in the stencil buffer whether a stencil value corresponding to the pixel is a pre-set value; if the stencil value corresponding to the pixel is the pre-set value, obtain an RGB value of the pixel by querying the render target; if the stencil value corresponding to the pixel is not the pre-set value, no processing being performed.

Figure 7:
FIG. 7 illustrates a principle diagram for obtaining the target image provided by the present disclosure.

The procedure of S504-S505 is explained below by examples:

FIG. 7 illustrates the RGB image obtained from the processing of S504. As the RGB values of the respective pixels of the RGB image are all (0, 0, 0), the entire RGB image is black. Assuming that the stencil buffer obtained from S501 is the one illustrated by FIG. 3, for each pixel on the RGB image shown by FIG. 7, the stencil value corresponding to the pixel is queried in the stencil buffer of FIG. 3. If the found stencil value is the pre-set value, the RGB value of the pixel is queried in the render target. If the stencil value corresponding to the pixel is not the pre-set value, the RGB value of the pixel is still (0, 0, 0). It is assumed that the pre-set value is 1. For example, with respect to the pixel in row 4, column 4 of FIG. 7, the corresponding stencil value of the pixel found in the buffer stencil shown by FIG. 3 is 1. The RGB value of the pixel is queried in the backup image. Assuming that (R=250, G=110, B=55), the RGB value of the pixel may be determined as (R=250, G=110, B=55). By the same method, the RGB of the pixels in row 4, columns 5-10, row 5, columns 4-10, row 6, columns 4, 5, 9 and 10, row 7, columns 4-10 and row 8, columns 4-10 may be obtained as shown in FIG. 7. For another example, the stencil value corresponding to the pixel in row 4, column 3 of FIG. 7 is found to be 0 in the stencil buffer shown by FIG. 3. The stencil value is not the pre-set value, so the RGB value of the pixel may be determined as (0, 0, 0).

S506: obtaining a post-processed image by post-processing the target image.

S507: determining an image to be displayed according to the post-processed image.

Optionally, when the post-processed image is obtained, it may be fused with the render target to produce the image to be displayed. As an example, during the fusing process, the RGB value of a pixel in the render target may be substituted with the RGB value of the corresponding target pixel on the post-processed image to obtain the image to be displayed. The above target pixel comprises pixels having non-zero RGB value. In such case, the post-processing is only performed on the pixels to be post-processed and the post-processing object is flexible and controllable. The user therefore has a stronger sense of participation and a better experience.

The method for image processing provided by this embodiment gives a detailed explanation about the process of obtaining the target image. In this embodiment, contents that are required to be post-processed are intercepted from the entire image using the stencil buffer and the intercepted contents are then post-processed. The post-processed contents are superimposed with the RGB image obtained from the rendering phase to generate a final image. In this way, the object of the post-processing is flexible and controllable. The user therefore has a stronger sense of participation and a better experience. In such case, no additional virtual camera is created and no pixel mask image is drawn. Therefore, the influence on frame rate is decreased and the possibility of video lags is reduced.

In some embodiments, the method for image processing provided by the present disclosure is applied in AR scenarios. In such case, the pixels corresponding to the image information rendered by the virtual camera may act as the pixels to be post-processed. Therefore, the post-processing is only performed on the information rendered by the virtual camera. Alternatively, pixels corresponding to part of the objects in the image information rendered by the virtual camera may serve as the pixels to be post-processed. Therefore, the post-processing is only performed on these objects. According to the method provided by the present disclosure, the pixel requiring post-processing is flexible and controllable. The user therefore has a stronger sense of participation and a better experience.

Figure 8:
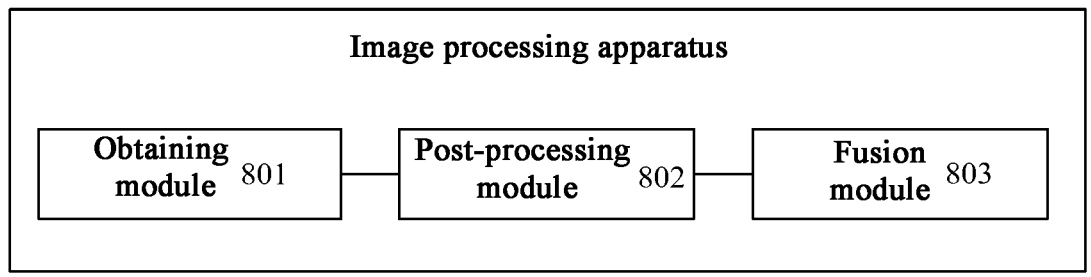
FIG. 8 illustrates a structural diagram of the image processing apparatus provided by the present disclosure.

FIG. 8 illustrates a structural diagram of the image processing apparatus provided by the present disclosure. According to FIG. 8, the image processing apparatus provided by the present disclosure comprises:

an obtaining module 801 configured to obtain an RGB image and a stencil buffer, wherein the RGB image comprises: image information taken by a physical camera and image information rendered by a virtual object rendering module, and the stencil buffer is used for storing stencil values corresponding to pixels on the RGB image, and pixels to be post-processed and pixels not to be post-processed on the RGB image correspond to different stencil values;

wherein the obtaining module 801 is further configured to obtain a target image by processing the RGB image according to the stencil buffer, wherein pixels not to be post-processed in the target image are in preset color;

a post-processing module 802 configured to obtain a post-processed image by post-processing the target image;

a fusion module 803 configured to determine an image to be displayed according to the post-processed image.

Optionally, the obtaining module 801 is further configured to:

obtain the RGB image according to RGB values of the image information taken by the physical camera and RGB values of the image information rendered by the virtual object rendering module; obtaining the stencil buffer by updating stencil values of the pixels to be post-processed in an original stencil buffer to a pre-set value, wherein stencil values corresponding to pixels stored in the original stencil buffer are a default value and the pre-set value differ from the default value.

Optionally, the obtaining module 801 is further configured to:

create a render target;

copy RGB values of pixels on the RGB image into the render target;

set RGB values of pixels on the RGB image to 0;

for each pixel on the RGB image, query in the stencil buffer whether a stencil value corresponding to the pixel is a pre-set value; in the case that the stencil value corresponding to the pixel is the pre-set value, obtain an RGB value of the pixel by querying the render target; in the case that the stencil value corresponding to the pixel is not the pre-set value, no processing being performed.

Optionally, the fusion module 803 is further configured to:

obtain the image to be displayed by fusing the render target with the post-processed image.

Optionally, the fusion module 803 is further configured to:

obtain the image to be displayed by substituting an RGB value of a pixel in the render target with a RGB value of a corresponding target pixel of the post-processed image, the target pixel comprising a pixel having non-zero RGB value.

The image processing apparatus provided by the present disclosure may perform steps in any of the above method embodiments. The implementation principles and technical effects of the apparatus are similar to the method and will not be repeated here.

Figure 9:
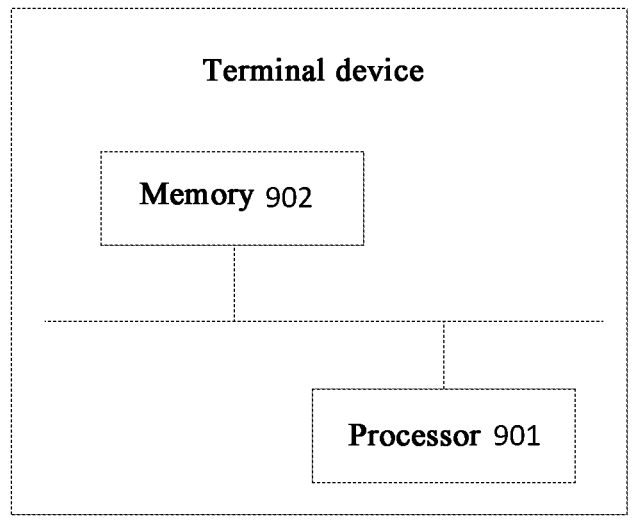
FIG. 9 illustrates a schematic diagram of the hardware structure of the terminal device provided by the present disclosure.

FIG. 9 illustrates a schematic diagram of the hardware structure of the terminal device provided by the present disclosure. According to FIG. 9, the terminal device of this embodiment may include:

a processor 901; and a memory 902 storing executable instructions of the processor;

wherein the processor 902 is configured to implement steps in any of the above method embodiments by executing the executable instructions. The implementation principles and technical effects of the terminal device are similar to the method and will not be repeated here.

The present disclosure provides a non-transitory computer readable storage medium, the non-transitory computer readable storage medium storing computer programs thereon, wherein the computer programs, when executed by a processor, implement steps in any of the above method embodiments. The implementation principles and technical effects of the computer readable storage medium are similar to the method and will not be repeated here.

The present disclosure provides a computer program product comprising computer programs. The computer programs are stored in the readable storage medium and at least one processor may read the computer programs from the readable storage medium. The computer programs, when executed by the at least one processor, cause the electronic device to implement steps in any of the above method embodiments. The implementation principles and technical effects of the computer program product are similar to the method and will not be repeated here.

The present disclosure provides a computer program, the computer program is stored in a readable storage medium. At least one processor may read the computer programs from the readable storage medium. The computer program, when executed by the at least one processor, causes the electronic device to implement steps in any of the above method embodiments. The implementation principles and technical effects of the computer program are similar to the method and will not be repeated here.

In the several embodiments provided by the present disclosure, it should be appreciated that the disclosed apparatus and method may be implemented in other ways. For example, the above described apparatus embodiments are only exemplary. For example, the units are divided by logic function in the previous description. However, they may be divided in other manners during practical implementation. For example, multiple units or components may be combined or integrated into a further system, or some features may be omitted or not executed. For another aspect, the mutual coupling or the direct coupling or the communication link displayed or discussed here may be fulfilled by some interfaces. Indirect coupling or communication link between apparatus or units may be in electrical, mechanical or other forms.

The units described as discrete components here may or may not be physically separated. The components displayed in the form of unit may or may not be physical units, i.e., they may be positioned at one place or distributed across a plurality of network units. According to the actual needs, some or all of the units may be selected to fulfill the objective of the solution of the embodiments.

Moreover, respective functional units in various embodiments of the present disclosure may be integrated into one processing unit or the respective units are present physically and independently, or two or more units may be integrated into one unit. The above integrated units may be implemented in the form of hardware or in the form of hardware plus software functional units.

The above integrated units implemented in the form of software functional units may be stored in the computer readable storage medium. The above software functional units are stored in one storage medium and include multiple instructions to enable one computer device (which may be personal computer, server or network device etc.) or one processor to execute part of the steps of the method according to various embodiments of the present disclosure. The aforementioned storage medium comprises various media that may store program codes, such as USB flash disk, mobile hard disk, Read-Only Memory (ROM for short), Random Access Memory (RAM for short), magnetic disk or optic disk.

It is to be appreciated that the processor described here may be a Central Processing Unit (CPU) or general-purpose processor, Digital Signal Processor (DSP), or Application Specific Integrated Circuit (ASIC) etc. The general-purpose processor may be a microprocessor or any conventional processor. With reference to the present disclosure, the steps of the method described here may be directly executed by the hardware processor or a combination of hardware and software modules in the processor.

Finally, it is to be understood that the above various embodiments are provided only for explaining the technical solution of the present disclosure, rather than limiting it. Although the present disclosure has been described in details with reference to the previous embodiments, those skilled in the art should understand that the technical solutions disclosed by the previous embodiments can still be modified and equivalent substitutions can still be made to part or all of the technical features disclosed here. Such modifications or substitutions are still within the scope of the technical solutions according to the various embodiments of the present disclosure.

What is claimed is:

1. An image processing method comprising:
    obtaining an RGB image and a stencil buffer, wherein the RGB image comprises: image information taken by a physical camera and image information rendered by a virtual object rendering module, and the stencil buffer stores stencil values corresponding to pixels of the RGB image, and pixels to be post-processed and pixels not to be post-processed of the RGB image correspond to different stencil values;
    obtaining a target image by processing the RGB image according to the stencil buffer, wherein pixels not to be post-processed in the target image are in a preset color;
    obtaining a post-processed image by post-processing the target image; and
    determining an image to be displayed according to the post-processed image.

2. The method of claim 1, wherein obtaining the RGB image and the stencil buffer comprises:
    obtaining the RGB image according to RGB values of the image information taken by the physical camera and RGB values of the image information rendered by the virtual object rendering module; and
    obtaining the stencil buffer by updating stencil values of the pixels to be post-processed in an original stencil buffer to a pre-set value, wherein stencil values corresponding to the pixels stored in the original stencil buffer are a default value and the pre-set value differ from the default value.

3. The method of claim 2, wherein obtaining the target image by processing the RGB image according to the stencil buffer comprises:
    creating a render target;
    copying RGB values of the pixels on the RGB image into the render target;
    setting RGB values of the pixels on the RGB image to zero; and
    for each pixel on the RGB image, querying in the stencil buffer whether a stencil value corresponding to the pixel is a pre-set value; in the case that the stencil value corresponding to the pixel is the pre-set value, obtaining an RGB value of the pixel by querying the render target; in the case that the stencil value corresponding to the pixel is not the pre-set value, no processing being performed.

4. The method of claim 3, wherein determining the image to be displayed according to the post-processed image comprises:
    obtaining the image to be displayed by fusing the render target with the post-processed image.

5. The method of claim 4, wherein obtaining the image to be displayed by fusing the render target with the post-processed image comprises:
    obtaining the image to be displayed by substituting an RGB value of a pixel in the render target with a corresponding RGB value of a target pixel of the post-processed image, the target pixel comprising a pixel having non-zero RGB value.

6. A non-transitory computer readable storage medium, storing a computer program thereon, the computer program, when executed by a processor, causing the processor to:
    obtain an RGB image and a stencil buffer, wherein the RGB image comprises: image information taken by a physical camera and image information rendered by a virtual object rendering module, and the stencil buffer stores stencil values corresponding to pixels of the RGB image, and pixels to be post-processed and pixels not to be post-processed of the RGB image correspond to different stencil values;
    obtain a target image by processing the RGB image according to the stencil buffer, wherein pixels not to be post-processed in the target image are in a preset color;
    obtain a post-processed image by post-processing the target image; and
    determine an image to be displayed according to the post-processed image.

7. The medium of claim 6, wherein the computer program causing the processor to obtain the RGB image and the stencil buffer comprises a computer program causing the processor to:
    obtain the RGB image according to RGB values of the image information taken by the physical camera and RGB values of the image information rendered by the virtual object rendering module; and
    obtain the stencil buffer by updating stencil values of the pixels to be post-processed in an original stencil buffer to a pre-set value, wherein stencil values corresponding to the pixels stored in the original stencil buffer are a default value and the pre-set value differ from the default value.

8. The medium of claim 7, wherein the computer program causing the processor to obtain the target image by processing the RGB image according to the stencil buffer comprises a computer program causing the processor to:
    create a render target;

copy RGB values of the pixels on the RGB image into the render target;

set RGB values of the pixels on the RGB image to zero; and for each pixel on the RGB image, query in the stencil buffer whether a stencil value corresponding to the pixel is a pre-set value; in the case that the stencil value corresponding to the pixel is the pre-set value, obtain an RGB value of the pixel by querying the render target; in the case that the stencil value corresponding to the pixel is not the pre-set value, no processing is performed.

9. The medium of claim 8, wherein the computer program causing the processor to determine the image to be displayed according to the post-processed image comprises a computer program causing the processor to:

obtain the image to be displayed by fusing the render target with the post-processed image.

10. The medium of claim 9, wherein the computer program causing the processor to obtain the image to be displayed by fusing the render target with the post-processed image comprises a computer program causing the processor to:

obtain the image to be displayed by substituting an RGB value of a pixel in the render target with a corresponding RGB value of a target pixel of the post-processed image, the target pixel comprising a pixel having non-zero RGB value.

11. A terminal device comprising:

a processor; and a memory storing executable instructions of the processor;

wherein the instructions, when executed by a processor, cause the processor to:

obtain an RGB image and a stencil buffer, wherein the RGB image comprises: image information taken by a physical camera and image information rendered by a virtual object rendering module, and the stencil buffer stores stencil values corresponding to pixels of the RGB image, and pixels to be post-processed and pixels not to be post-processed of the RGB image correspond to different stencil values;

obtain a target image by processing the RGB image according to the stencil buffer, wherein pixels not to be post-processed in the target image are in a preset color;

obtain a post-processed image by post-processing the target image; and determine an image to be displayed according to the post-processed image.

12. The terminal device of claim 11, wherein the instructions causing the processor to obtain the RGB image and the stencil buffer comprises instructions causing the processor to:

obtain the RGB image according to RGB values of the image information taken by the physical camera and RGB values of the image information rendered by the virtual object rendering module; and obtain the stencil buffer by updating stencil values of the pixels to be post-processed in an original stencil buffer to a pre-set value, wherein stencil values corresponding to the pixels stored in the original stencil buffer are a default value and the pre-set value differ from the default value.

13. The terminal device of claim 12, wherein the instructions causing the processor to obtain the target image by processing the RGB image according to the stencil buffer comprises instructions causing the processor to:

create a render target;

copy RGB values of the pixels on the RGB image into the render target;

set RGB values of the pixels on the RGB image to zero; and for each pixel on the RGB image, query in the stencil buffer whether a stencil value corresponding to the pixel is a pre-set value; in the case that the stencil value corresponding to the pixel is the pre-set value, obtain an RGB value of the pixel by querying the render target; in the case that the stencil value corresponding to the pixel is not the pre-set value, no processing is performed.

14. The terminal device of claim 13, wherein the instructions causing the processor to determine the image to be displayed according to the post-processed image comprises instructions causing the processor to:

obtain the image to be displayed by fusing the render target with the post-processed image.

15. The terminal device of claim 14, wherein the instructions causing the processor to obtain the image to be displayed by fusing the render target with the post-processed image comprises instructions causing the processor to:

obtain the image to be displayed by substituting an RGB value of a pixel in the render target with a corresponding RGB value of a target pixel of the post-processed image, the target pixel comprising a pixel having non-zero RGB value.

* * * * *